United States Patent [19]

Raymond, Jr. et al.

[11] Patent Number: 5,564,461

[45] Date of Patent: Oct. 15, 1996

[54] ASSEMBLY FOR CONNECTING AN ACTUATOR TO A ROTARY VALVE

[75] Inventors: Frank J. Raymond, Jr., Houston, Tex.; Frank W. Johnston, Clydebank, United Kingdom; Lawrence F. Boyd, Cypress, Tex.

[73] Assignee: Bray International, Inc., Houston, Tex.

[21] Appl. No.: 556,224

[22] Filed: Nov. 9, 1995

[51] Int. Cl.⁶ .............................. F16K 43/00; F16K 1/22
[52] U.S. Cl. .................. 137/315; 248/674; 251/58; 251/292; 251/305; 403/337
[58] Field of Search ...................... 137/315, 343; 92/69 R; 248/674; 251/58, 304, 305, 306, 308, 291, 292; 403/337

[56] References Cited

U.S. PATENT DOCUMENTS

| | | | |
|---|---|---|---|
| 3,452,961 | 7/1969 | Forsman | 251/58 |
| 3,650,506 | 3/1972 | Bruton | 251/58 |
| 4,087,074 | 5/1978 | Massey et al. | 251/58 |
| 4,313,595 | 2/1982 | Markley et al. | 251/292 |
| 4,633,897 | 1/1987 | Effenberger | 251/292 |
| 4,719,939 | 1/1988 | Killian | 137/315 |
| 4,887,634 | 12/1989 | Killian | 251/292 |
| 5,240,030 | 8/1993 | Wang | 251/292 |
| 5,257,771 | 11/1993 | Portis et al. | 251/292 |

*Primary Examiner*—George L. Walton
*Attorney, Agent, or Firm*—Vaden, Eickenroht & Thompson

[57] ABSTRACT

There is disclosed an assembly for connecting an rotary valve and actuator wherein the actuator has a circle of holes in its mounting face and the valve has a circle of bolt holes in its flange adapted to receive bolts intended for make up with the threaded holes of the mounting face of the actuator, but wherein, due to circumstances of the manufacture of the valve and actuator, or otherwise, the circles are of different diameter so as to prevent connection of the valve and actuator in conventional manner. Thus, connection is instead made by an assembly including a spacer plate disposed between a mounting face of the actuator and a flange, and connected by studs made up with threaded holes in the mounting face and bolts extended through the bolt holes in the flange of the valve for make up with threaded holes in the plate.

8 Claims, 3 Drawing Sheets

5,564,461

ASSEMBLY FOR CONNECTING AN ACTUATOR TO A ROTARY VALVE

This invention relates generally to an assembly for connecting a rotary valve and actuator not originally intended for connection to one another, such as, for example, in the case of a valve and actuator of different manufacturers. More particularly, it relates to an improved assembly of this type wherein the actuator has a circle of threaded holes in its mounting face and the valve has a circle of bolt holes in its flange adapted to receive bolts intended for make up with the threaded holes, but wherein, due to the circumstances of manufacture or otherwise, the circles are of different diameter thus preventing connection in the intended manner.

It has therefore been necessary to connect such actuators and valves by means of an assembly including a bracket which, in addition to being expensive and time consuming to install, increases the overall headroom required by the valve and actuator which, in many installations, is at a premium. Hence, it is the object of this invention to provide an assembly for this purpose which overcomes these and other problems in that it is relatively inexpensive, relatively easy to install and of such construction as to require a minimum of excessive head room or other space in and around the valve and actuator.

This and other objects are accomplished, in accordance with the illustrated embodiment of this invention, by an assembly which comprises a plurality of studs each having one end for threaded connection to one of the circle of threaded holes in the mounting face of the actuator, a segment mounted on the other end of each stud, and a spacer plate disposable between the mounting face and flange and having a central hole through which the drive parts of the actuator and valve may be connected. The spacer plate also has circumferentially spaced slots each to closely receive and thus align the segment, when the stud is made up with the threaded holes, to draw the one side of the plate toward engagement with the face. More particularly, each segment has a threaded hole which is adapted, when the segment is so aligned, for alignment with a bolt hole of the circle of bolt holes, and a means is provided including a plurality of bolts each for extension through a bolt hole in the flange for making up one end thereof with a threaded hole in the plate so as to force and hold the flange tightly against the other side of the plate.

Preferably, the segments are thinner than the plate to allow for adjustment of the extent of make up of the studs as each segment is aligned within a slot in the plate.

In one embodiment of the invention, the threaded holes and thus the studs are on a larger diameter circle then the bolt holes and thus the bolts. In another, the bolt holes and thus the bolts are on a larger diameter circle than the studs and thus the threaded holes.

Frequently, the circles of threaded and bolt holes are of diameters which are close enough to one another that their adjacent inner sides, and thus those of the studs and bolts, would radially overlap and thus interfere with one another. Due to the fact that rotational orientation of the drive parts of the respective actuator and valve are predetermined, it is not possible to merely rotate the flange and mounting face to positions in which their holes would avoid this overlap. Although another possible solution would be to substantially increase the thickness of the plate to the extent that the ends of the studs and holes were axially displaced, this would, like the aforementioned brackets, substantially reduce the headroom required for the valve and actuator.

Hence, it is a more particular object of the invention to provide an assembly of the type above described which enables valves and actuators having such closely spaced circles of threaded and bolt holes to be connected through a spaced plate of the thinnest possible construction.

This further object is accomplished, in accordance with another novel feature of the invention, in that each stud has a pin extending from one side of its other end for fitting closely within and secured to an opening in the segment to one side of the bolt hole in the segment with the other side of its outer end essentially flush with the one side of the plate. Preferably, the outer end of the opening has a recess to permit the end of the pin to be upset adjacent the edge of the recess.

In the drawings, wherein like reference characters are used throughout to designate like parts:

Figure 1:
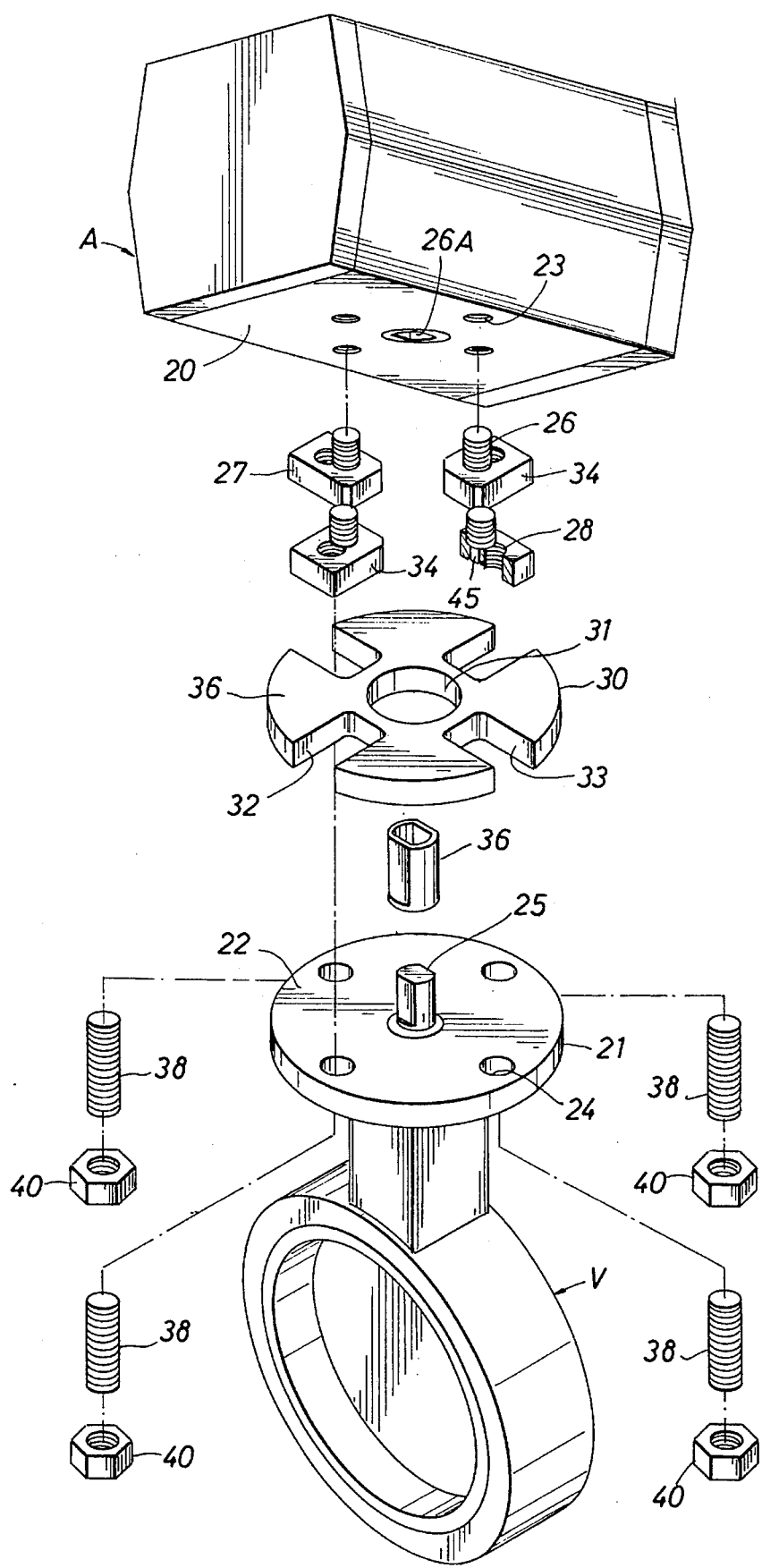
FIG. 1 is an exploded view of a valve and actuator of the type anticipated by the present invention and the assembly for connecting them which is constructed in accordance with the one embodiment of the present invention wherein the circle of stud holes in the mounting face of the actuator is of smaller diameter than the circle of bolt holes in the flange of the valve.

With reference now to the details of the above-described drawings, the actuator A is shown in FIG. 1 to have a mounting face 20 on its lower side and the valve V to have a flange 21 with a mounting face 22 on its upper side, with the mounting face of the actuator A having a circle of stud holes 23 formed therein and the flange has a circle of bolt holes 24. As above described, the assembly of each embodiment of the present invention is adapted for use in a situation in which the stud holes and bolt holes, rather than being on the same diameter to permit connection of the flange directly to the mounting face by bolts in usual fashion, are arranged on different diameters. More particularly, and again as previously described, the present invention has particularly utility in connecting an adapter and flange wherein the stud and bolt holes are on diameters which are sufficiently close to one another that their respective inner sides overlap.

As also well known in the art, a stem 25 extends upwardly through the top of the flange 21 of the valve for use in rotating the closure element of the valve between open and closed positions by means of the actuator A. Thus, the actuator in turn has an opening 26A formed in its mounting face 20 to receive the stem for rotating the valve 90° between open and closed positions. As shown, the valve stem and cooperating actuating parts of the actuator are arranged along the center of the circles of bolts and stud holes, and there are four equally circumferentially spaced stud holes and bolt holes about the axis of the stem and corresponding actuator parts.

Figure 2:
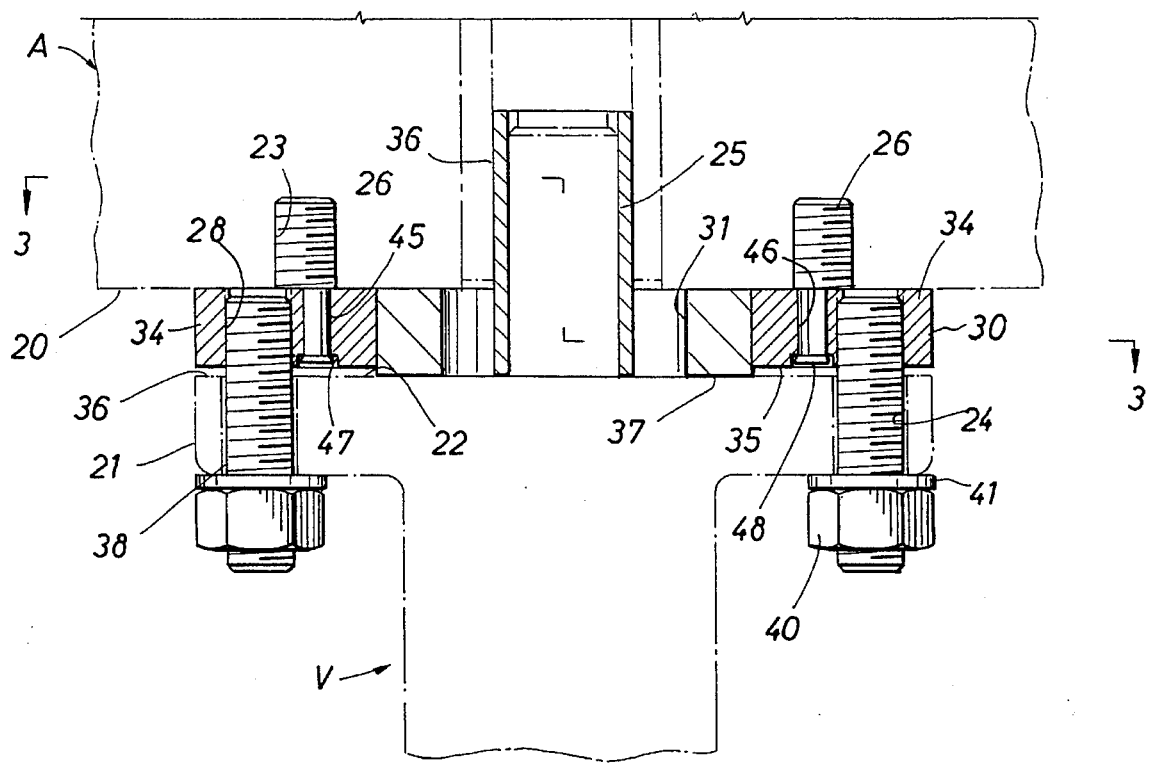
FIG. 2 is a vertical sectional view of the assembly in mounted position to connect the valve and actuator of FIG. 1, as seen along broken lines 2—2 of FIG. 3, and with portions of the mounting face of the actuator and flange of the valve shown in phantom.
Figure 3:
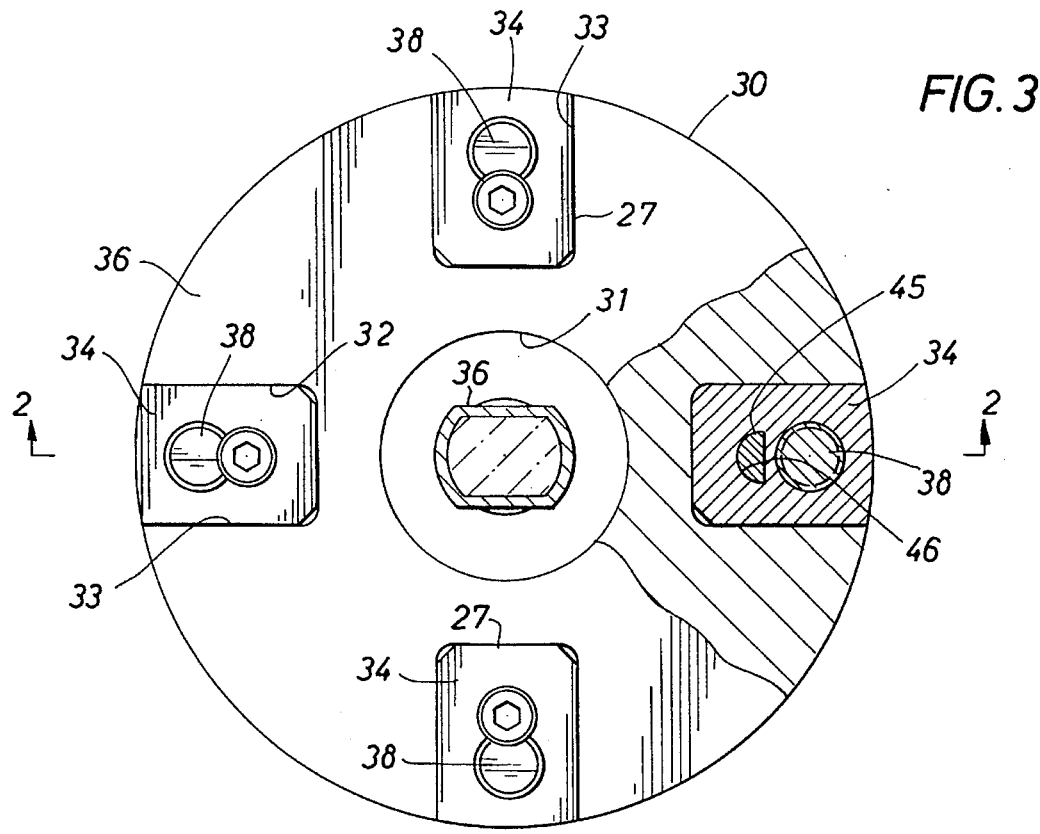
FIG. 3 is a horizontal sectional view, of the actuator, valve and assembly, broken away in part, and as seen along broken lines 3—3 of FIG. 2.

In its preferred embodiment of FIGS. 1 to 3, the assembly includes a plurality of studs 26 each having one end for threaded connection with one of the stud holes 23, and a corresponding number of segments 27 mounted on the other end of each stud. More particularly, each segment also has a threaded hole 28 extending therethrough with its axis to one side of the axis of the stud on which the segment is mounted. The assembly further includes a spacer plate 30 which is shown to be of approximately the same diameter as the flange 21 on the valve and which has a central hole 31 therethrough adapted to receive the connection of the stem and drive part (not shown) of the actuator.

The spacer plate has four slots 32 extending inwardly from its outer diameter at equally spaced circumferentially spaced locations. More particularly, these slots have flat sides 33 adapted to receive flat sides of the segments and of essentially the same radial length as the length of the segments from one end to the other. Thus, when the studs of each of the segments is made up with the stud hole, they may be moved to generally radially extending positions in which the sides 33 of the slots 32 of the plate may fit closely over the segments so as to align the holes 28 in the segments with the bolt holes 24 in the flange of the valve.

More particularly, the studs may be made up with the stud holes to the extent necessary to cooperate with the others in bringing the upper face of the segment plate close to the mounting face 20 of the actuator, while at the same time permitting them to dispose the bolt holes in the segments in radially extending positions prior to assembly of the slots in the mounting plate thereover. The segments are sufficiently thinner than the spacer plate to permit the bottom sides 35 of the segments to remain above the mounting face 22 of the flange 21 as each stud is made up of its stud hole, whereby the lower face 37 of the plate is positioned for tight engagement by the mounting face 22 of the flange 21 when the flange is connected to the segments, as will be described.

The assembly also includes bolts 38 each for extension through a bolt hole 24 in the flange of the valve and having one end for threaded connection with a bolt hole 28 in a radially aligned segment. When made up with the bolt holes 24, the bolts are locked in place by means of a nut 40 threaded over the opposite end of each bolt and having a washer 41 on its upper side for engagement with the lower side of the flange of the valve when the nut is fully made up to force the mounting face of the flange tightly against the lower side of the spacer plate, and thus the upper side of the spacer plate close to the mounting face 20 of the actuator.

The actuator drive part and valve stem are connected for rotation with one another by an adapter sleeve 36 which extends through hole 31 in the adapter plate. Thus, as shown, the sleeve has flat sides for fitting closely over the flat sides of the valve stem and closely within corresponding flat sides of the actuating drive part.

As previously described, the invention has particular utility in those instances in which the circles of stud holes and bolt holes are sufficiently close together that they and the studs and bolts they are to receive radially overlap one another. Moreover, due to this overlap, the studs and bolts would, if made of convention construction, require the spacer plate to be of a thickness equal to both their lengths.

In accordance with the present invention, however, each stud is mounted to its segment by means of a pin 45 extending from lower end of the stud and secured within a hole 46 radially to one side of the bolt hole in the segment. In the case of the embodiment of FIG. 1 to 3, of course, the hole would be disposed on the inner side of the bolt hole for use in mounting the stud in vertically overlapping relation to the bolt at their inner sides.

As shown, the pin and the opening 46 in which it is closely received are out of round so that the segment rotates with the stud as the stud is moved to a position in which to dispose the segment in the desired radial direction. For this purpose, the lower end of the hole has a recess 47 formed thereabout to permit the lower end of the pin to be upset firmly against the inner diameter of the recess in order to prevent vertical separation of the pin from the hole. The pin and opening are preferably of semi-circular shape with their flat sides adjacent the bolt holes to maximize the thickness of the web between them.

Figure 4:
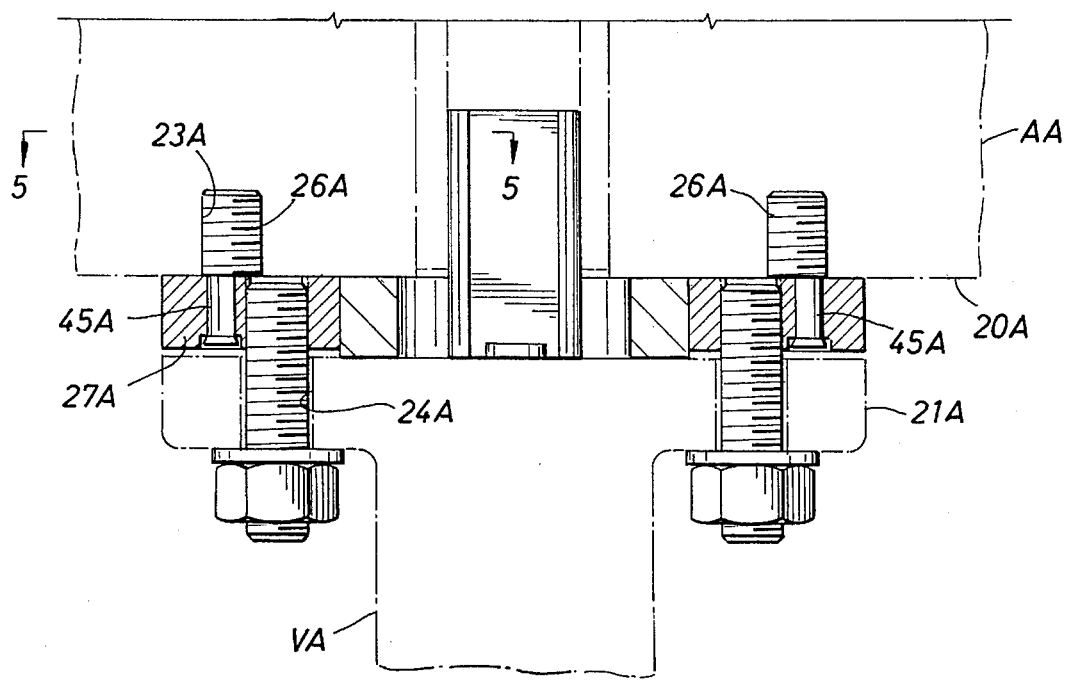
FIG. 4 is a vertical sectional view of an alternative embodiment of the assembly, similar to that of FIG. 2, but wherein the circle of stud holes in the mounting face of the actuator are on a larger diameter than the circle of bolt holes in the valve flange.
Figure 5:
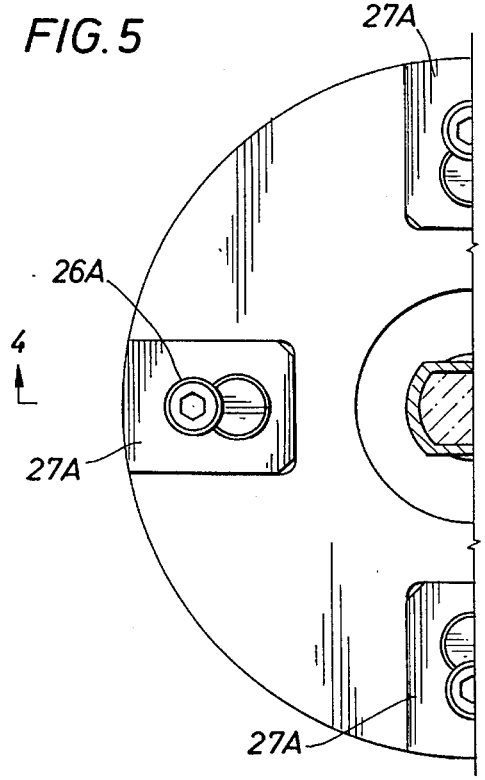
FIG. 5 is a partial horizontal sectional view of the assembly of FIG. 4, as seen along broken lines 5—5 thereof.
Figure 6:
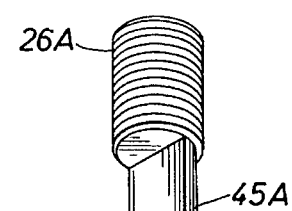
FIG. 6 is an enlarged exploded view of the segment and stud of the embodiment of the assembly of FIGS. 4 and 5.

As previously described, the embodiment of the assembly shown in FIGS. 4 to 6 is for use in connecting a valve and actuator wherein the stud holes 23A in the actuator AA (see FIG. 4) are arranged on a circle of greater diameter than the bolt holes 24A in the flange 21A of the valve VA. Thus, in this case, the holes 46A for receiving the pins 45A of the studs 26A are arranged radially to the opposite or outer side of the bolt holes 24A and thus closer to the outer ends of the segments 27A. In other respects, the parts and their cooperation with one another are the same as those of the embodiment of the assembly shown in FIGS. 1 to 3, and are thus designated by the same reference numbers except for the addition of the suffix "A".

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An assembly for use in removably connecting an actuator to a rotary valve wherein drive parts of each are adapted to be engaged with one another to impart rotation to the closure member of the valve, and the actuator has a mounting face with a circle of threaded holes and the valve has a mounting flange with a circle of bolt holes of different diameter than the threaded holes, comprising a plurality of studs each having one end for threaded connection to one of the threaded holes in the mounting face of the actuator, a segment mounted on the other end of each stud, wherein the segment being removably mounted to the mounting face of the actuator a spacer plate disposable between the mounting face and the mounting flange and having a central hole through which the drive parts may be connected, and circumferentially spaced slots each to closely receive and thus align a segment therein when back of the stud are threadedly connected with the holes in the actuator to draw the one side of the segment toward engagement with the mounting face of the actuator, each segment having a threaded hole which is adapted, when the segment is so aligned within said slots, for alignment with a bolt hole in the flange, and means including a plurality of bolts each for extending through a bolt hole in the flange for securing one end thereof with, a threaded hole in the segment so as to force and hold the flange tightly against the other side of the plate and thus the one side of the plate being forced tightly against the mounting face of the actuator as the plurality of bolts are threaded.

2. As in claim 1, wherein the threaded holes are on a larger diameter circle.

3. As in claim 1, wherein the bolt holes are on a larger diameter circle.

4. As in claim 1, wherein the segments are thinner, than the plate to allow for adjustment of the extent of threading of the studs as each segment is aligned within a slot in the plate.

5. As in claim 1, wherein the inner sides of the threaded holes and bolt holes radially overlap.

each stud has a pin secured to and extending from one side of its other end that is secured within an opening in the segment to one side of the bolt hole with the other side of its other end essentially flush with the one side of the plate.

6. As in claim 5, wherein there is a recess about the outer end of the opening, and the outer end of the pin is upset against the inner end of the recess.

7. As in claim 5, wherein the threaded holes are on a larger diameter circle, and the pins are radially inwardly of the bolts.

8. As in claim 5, wherein the bolt holes are on a larger diameter circle, and the pins are radially outwardly of the bolts.

* * * * *

UNITED STATES PATENT AND TRADEMARK OFFICE
CERTIFICATE OF CORRECTION

PATENT NO. : 5,564,461

DATED : October 15, 1996

INVENTOR(S) : Frank J. Raymond, Jr., Frank W. Johnston, Lawrence F. Boyd

It is certified that error appears in the above-identified patent and that said Letters Patent is hereby corrected as shown below:

In the Abstract:  Line 1,  change "an" to --a--.

Column 1,   line 51, change "then" to --than--.
    Column 2,   line 28, change the period to a comma.
    Column 2,   line 41, change the semi-colon to a period.
    Column 2,   line 54, change "particularly" to --particular--.
    Column 3,   line 27, change "segment plate" to --segment--.
    Column 3,   line 60, change "convention" to --conventional--.
    Column 3,   line 64, before "lower" insert --the--.
    Column 3,   line 66, change "FIG" to --FIGS".

Column 4,   line 50, change "wherein" to --whereby--.
    Column 4,   line 51, change "being" to --is--.
    Column 4,   line 52, after "actuator" insert a comma.
    Column 4,   line 58, change "back" to --each--.
    Column 4,   line 58, change "stud" to --studs--.
    Column 5,   line  1, chnage "with" to --within--.
    Column 5,   line 10, delete the second comma.
    Column 5,   line 16, change the comma to a semi-colon.

Signed and Sealed this

Twenty-fifth Day of March, 1997

BRUCE LEHMAN

*Attest:*

*Attesting Officer*

*Commissioner of Patents and Trademarks*